United States Patent [19]

Koyama et al.

[11] Patent Number: 4,803,332
[45] Date of Patent: Feb. 7, 1989

[54] APPARATUS FOR PLASMA TREATMENT OF A SHEET-LIKE STRUCTURE

[75] Inventors: Motoyasu Koyama, Kurashiki; Hidetoshi Teraoka, Soja; Takao Akagi; Shinji Yamaguchi, both of Kurashiki; Itsuki Sakamoto, Hiroshima; Akira Namba; Isao Okagaki, both of Okayama, all of Japan

[73] Assignee: Kuraray Co., Ltd., Okayama, Japan

[21] Appl. No.: 58,858

[22] Filed: Jun. 5, 1987

[30] Foreign Application Priority Data

Jun. 10, 1986 [JP] Japan .................................. 61-134067
Jun. 11, 1986 [JP] Japan .................................. 61-135579

[51] Int. Cl.$^4$ .............................................. B23K 9/00
[52] U.S. Cl. .......................... 219/121.52; 219/121.43; 219/121.49; 250/324; 264/22; 204/164
[58] Field of Search ...... 219/121 P, 121 PY, 121 PR, 219/121 PN, 121 PG, 121 PD, 383, 384; 118/50.1, 692; 204/164, 308, 165; 156/345, 646, 89, 272.2; 250/324, 325; 264/22, 25

[56] References Cited

U.S. PATENT DOCUMENTS

| | | |
|---|---|---|
| 3,502,845 | 3/1970 | Schirmer .............................. 219/384 |
| 3,998,718 | 12/1976 | Melliar-Smith .............. 219/121 PX |
| 4,292,384 | 9/1981 | Straughan et al. ........... 219/121 PG |
| 4,456,570 | 6/1984 | Thomas et al. .............. 425/174.8 E |
| 4,507,539 | 3/1985 | Sando et al. ................... 219/121 PY |
| 4,563,316 | 1/1986 | Isaka et al. .................... 425/174.8 E |
| 4,659,899 | 4/1987 | Welkie et al. ................. 219/121 PN |

Primary Examiner—M. H. Paschall
Attorney, Agent, or Firm—Birch, Stewart, Kolasch & Birch

[57] ABSTRACT

A plasma treating apparatus for a sheet-like structure which comprises a generally drum-shaped first discharge electrode assembly rigidly mounted on a rotary shaft which extends through a vacuum vessel, the rotary shaft providing rotation to the electrode assembly. The sheet-like structure is adapted to follow the outer periphery of the first discharge electrode assembly. The apparatus further comprises a second discharge electrode assembly disposed within the vacuum chamber so as to confront the first discharge electrode assembly. The vacuum vessel is electrically insulated from an electric circuit which is connected to both of the first and second discharge electrode assemblies. Insulating members are also interposed between a cylindrical body of the drum of the first discharge electrode assembly and the rotary shaft to electrically insulate the first electrode assembly from the rotary shaft.

15 Claims, 10 Drawing Sheets

APPARATUS FOR PLASMA TREATMENT OF A SHEET-LIKE STRUCTURE

BACKGROUND OF THE INVENTION

1. Field of the Invention

The present invention generally relates to an apparatus for treating a sheet-like structure, for example, a plastics film or fabrics of the like, with plasma to improve the chemical, physical, mechanical, optical and-/or electrical properties, and/or the surface structure of the sheet-like structure. More specifically, the present invention relates to a plasma treating apparatus comprising a vacuum vessel filled with a plasma and having a rotatably supported drum-shaped discharge electrode assembly over which the sheet-like structure is passed for the plasma treatment at low temperature.

2. Description of the Prior Art

Recently, the plasma treatment has attracted the attention of those skilled in the art as an effective method for treating a sheet-like structure, for example, a plastics film or fabrics with plasma to improve the chemical, physical, mechanical, optical and/or electrical properties, and/or the surface structure of the sheet-like structure. More specifically, it is well described in the Japanese Laid-open Patent Publication No. 57-18737, published in 1982, and the Japanese Laid-open Patent Publication No. 60-149441, published in 1985, that by using the plasma treatment, the weldability, the frictional property, the feeling or handling property, the luster, and/or the color fixing property of the sheet-like structure can be improved so as to avoid a build-up of an electrostatic charge, to facilitate the surface hardening or roughening, to avoid the occurrence of blocking or to permit the dyed color to be thickened.

The known plasma treatment apparatus for treating the sheet-like structure with plasma as disclosed in any one of the above mentioned publications makes use of, as is the case with the predecessor of such apparatus, a generally drum-shaped discharge electrode assembly fixedly mounted on a rotary shaft extending through a vacuum vessel and a generally rod-shaped discharge electrode assembly disposed within the vacuum vessel in a face-to-face relationship with the drum-shaped discharge electrode assembly. According to this prior art plasma treating apparatus, the arrangement has been made to avoid any possible occurrence of a plasma discharge from both of the discharge electrode assemblies into the vacuum vessel by insulating the vacumm vessel from, for example, an electric circuit system with which both of the discharge electrode assemblies are connected, thereby minimizing the consumption of electric power.

It has, however, been found that, since the drum-shaped discharge electrode assembly is directly mounted on the rotary shaft to enable rotation of the discharge electrode assembly. The rotary shaft is also electrically charged during the operation of the apparatus. Because of this, a plasma discharge tends to occur from the rod-shaped discharge electrode assembly to the rotary shaft, resulting in the consumption of a relatively increased amount of electric power.

Also, the plasma treatment apparatus designed specifically for the plasma treatment of a sheet-like structure tends to be bulky in view of the fact that the sheet-like structure to be treated with plasma has a substantial width; and therefore, in order for the plasma treatment apparatus to be adopted in practice by industries, the plasma treatment apparatus must have a handling capacity corresponding to the relatively great amount of plant investment needed to implement this apparatus. In other words, in order for the handling capacity of the plasma treatment apparatus to be increased, the input, originally large, to the plasma treatment apparatus for creating the plasma-filled atmosphere must be further increased to increase the plasma density within the vacuum vessel. However, within a vacuum vessel filled with a plasma having a very low electric resistance, the increase of an input would result in local unevenness of the electrical distribution between the discharge electric circuit, disposed within but electrically insulated from the vacuum vessel, and the vacuum vessel; and therefore, insufficient electric insulation may occur at a corner area; for example, at an area between the rotary shaft extending through the vacuum vessel and a portion of the vacuum vessel adjacent the rotary shaft. This would allowing an electric current to flow through the vacuum vessel causing the inner wall of the vacuum vessel to become electrically overcharged (being luminous) resulting in an instantaneous abnormal spark discharge. Accordingly, the plasma discharge occurring within the vacuum vessel becomes so unstable that the plasma treatment apparatus can no longer be continuously operated.

SUMMARY OF THE INVENTION

The present invention has, accordingly, been developed to substantially eliminate the above discussed problems inherent in the prior art plasma treatment apparatus and has as its essential objective, to provide an improved plasma treatment apparatus for the treatment of a sheet-like structure with plasma which can be continuously operated with the supply of a relatively large amount of electric power while minimizing the consumption of the electric power due to abnormal spark discharging, and therefore, can be adopted in practice by industries.

In order to accomplish the above described objective, the present invention is an improved plasma treatment apparatus which comprises a generally drum-shaped first discharge electrode assembly, a second discharge electrode assembly disposed a face-to-face relationship with the first discharge electrode assembly, an electric circuit connected between the first and second discharge electrode assemblies, and an electrically insulating material interposed between the rotary shaft, extending through the vacuum vessel, and a cylindrical body of the first discharge electrode assembly.

According to the present invention, since the vacuum vessel is, as is the case with the prior art plasma treatment apparatus, electrically insulated from the electric circuit, a loss of plasma being discharged into the vacuum vessel can be minimized or substantially eliminated. Also, since the electrically insulating material is interposed between the rotary shaft and the cylindrical body, the rotary shaft itself can be electrically insulated from the first discharge electrode assembly and, therefore, there is no substantial possibility that a plasma discharge may occur from the second discharge electrode assembly to the rotary shaft.

Moreover, since the rotary shaft is electrically insulated from the first discharge electrode assembly and the vacuum vessel is also electrically insulated from the electric circuit with which both of the first and second discharge electrode assemblies are connected, there is no substantial possibility that a narrow corner area between the vacuum vessel, through which the rotary shaft extends, and a portion of the rotary shaft extending through the vacuum vessel would be insufficiently insulated electrically to cause the possibility of an abnormal spark discharge.

BRIEF DESCRIPTION OF THE DRAWINGS

In any event, the present invention will become more clearly understood from the following detailed description of preferred embodiments when taken in conjunction with the accompanying drawings. However, the embodiments and the drawings are given only for the purpose of illustration and explanation and are not to be taken as being limitative of the present invention in any way whatsoever, whose scope is to be determined solely by the appended claims. In the drawings, like reference numerals denote like parts in the several views, and:

DETAILED DESCRIPTION OF THE PREFERRED EMBODIMENTS

Figure 1:
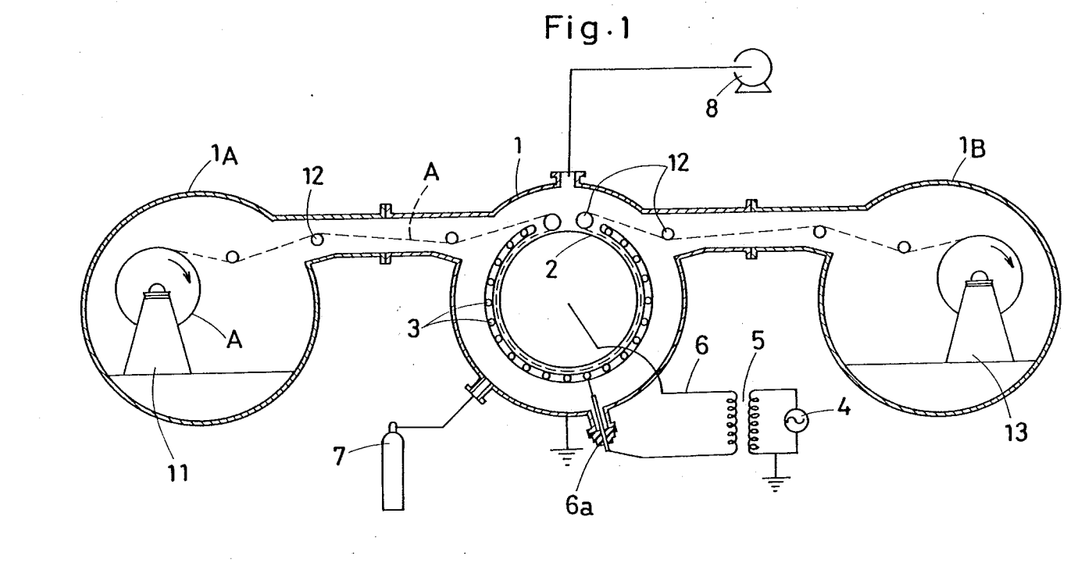
FIG. 1 is a schematic sectional view showing the construction of a plasma treatment apparatus according to a first preferred embodiment of the present invention.

Referring to FIG. 1, a vacuum vessel generally identified by 1 accommodates a generally drum-shaped electrode assembly 2 (or a first discharge electrode assembly) and a second discharge electrode assembly 3. The second discharge electrode assembly is comprised of a plurality of generally rod-shaped electrodes disposed radially around the drum-shaped electrode assembly 2 and extending in parallel relationship with each other and the drum-shaped electrode assembly 2. These discharge electrode assemblies 2 and 3 are adapted to receive an electric voltage from a source of alternating current 4 through a transformer 5 and an electric circuit 6 connected to both of the discharge electrode assemblies 2 and 3.

The vacuum vessel 1 is made of stainless steel and is maintained at a very low pressure by means of an evacuator 8, used to establish a substantial vacuum inside the vacuum vessel 1 when filled with a plasma treatment gas supplied from a pressurized gas vessel 7 containing a pressurized plasma treatment gas. This vacuum vessel 1 has auxiliary vacuum vessels 1A and 1B positioned on respective sides of the vacuum vessel 1 and flanged to the vacuum vessel 1 to create fluid communication between the vessels. The auxiliary vacuum vessels 1A and 1B accommodate therein a sheet feeder unit 11 and a sheet take-up unit 13, respectively. Reference character A represents a sheet material which is supplied from the sheet feeder unit 11 towards the sheet take-up unit 13, through a plurality of motor-driven guide rolls 12. An intermediate portion of the sheet material A is turned around the drum-shaped discharge electrode assembly 2. In other words, while the sheet material A is drawn out from the sheet feeder unit 11 and reeled onto the sheet take-up unit 13 through the guide rolls 12 and around the drum-shaped discharge electrode assembly 2, the web sheet of material can be continuously treated with a low-temperature plasma as it passes over the drum-shaped discharge electrode assembly 2 within the vacuum vessel 1 filled with a plasma atmosphere.

Figures 2, 3:
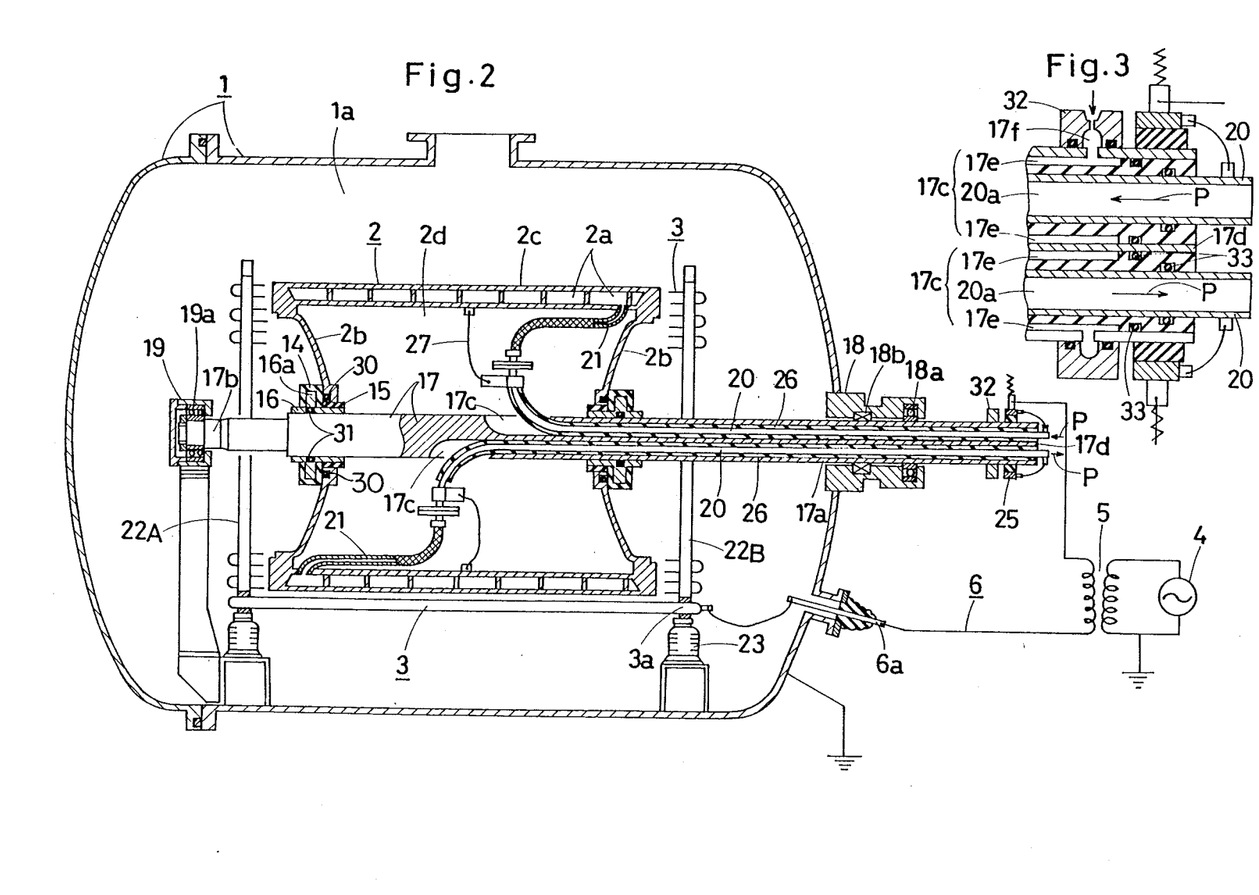
FIG. 2 is a longitudinal sectional view of the plasma treatment apparatus shown in FIG. 1.
FIG. 3 is a longitudinal sectional view, on an enlarged scale, of an outer end portion of a rotary shaft.

Referring to FIG. 2, the drum-shaped discharge electrode assembly 2 is provided with a coolant jacket (a continuous, but slow passage for the coolant) 2a for the passage of a cooling medium having a low electroconductivity, such as distilled water or silicone oil. The jacket 2a is defined in a cylindrical wall portion of the drum forming the drum-shaped discharge electrode assembly 2. Opposite end walls 2b of the drum-shaped discharge electrode assembly 2 are generally spherically curved inward close in a direction close towards each other. The drum-shaped discharge electrode assembly 2 is rigidly mounted on a rotary shaft 17 to enable of the discharge rotation electrode assembly by means of annular electrically insulating members 14 and 15 and annular couplings 16 positioned at respective central portions of the opposite end walls 2b while the rotary shaft 17 extends axially through the opposite end walls 2b. Each of the annular electrically insulating members 14 of a generally U-shaped cross-section and comprises, for example, a glass lining 14 having excellent weatherability. The glass lining 14 is lined on an annular collar 16a of the respective coupling 16. The glass lining 14 can be formed; for example, by applying a slurry layer of glass particles on a surface of the respective coupling 16 and then baking the slurry layer. On the other hand, each of the annular electrically insulating members 16 is made of, for example, polycarbonate resin. Reference numeral 30 represents a rubber ring seated in an annular groove defined in each of the opposite end walls 2b for sealing an annular gap between the drum-shaped discharge electrode assembly 2 and the respective electrically insulating member 14. Reference numeral 31 represents a rubber ring seated in an annular groove defined in the respective coupling 16 for sealing an annular gap between the respective coupling 16 and the rotary shaft 17. It is noted that since the electrically insulating members 14 are lined on the respective couplings 16, annular gaps each between the respective coupling 16 and the associated electrically insulating member 14 are sealed as a matter of fact. Accordingly, the interior 2d of the drum-shaped discharge electrode assembly 2 is completely sealed from the interior 1a of the vacuum vessel 1.

The rotary shaft 17 is adapted to be driven by an electrically powered drive motor (not shown) positioned exteriorly of the vacuum vessel 1 and is rotatably supported by the vacuum vessel 1 at a substantially intermediate portion 17a and an inner end 17b by respective bearing assemblies 18 and 19 each having ball bearings 18a or 19a. In other words, the rotary shaft 17 extends coaxially through the drum-shaped discharge electrode assembly 2 with its opposite end portions protruding axially outwardly from the opposite end walls 2b of the drum-shaped discharge electrode assembly 2 in a direction away from each other and which are in turn supported rotatably. Reference numeral 18b represents a mechanical seal provided in the bearing assembly 18 for sealing the interior 1a of the vacuum vessel 1 from the atmosphere.

The rotary shaft 17 has two axial bores 17c for allowing communications between the interior 2d of the drum-shaped discharge electrode assembly 2 and the outside of the vacuum vessel 1. The axial bores 17c are defined in the rotary shaft 17 so as to extend axially inwardly from the outer end 17d of the rotary shaft 17. A copper tube 20 having its outer peripheral surface coated with an insulating layer 26 of electrically insulating material such as, fluorine contained resin is best shown in FIG. 3. The electrically insulating material inserted into each of the axial bores 17c with a small annular gap 17e formed between the insulating layer 26 and the inner peripheral surface of the respective axial bore 17c. Each of the copper tubes 20 has a coolant passage 20a defined over the entire length of tube for allowing the flow of a cooling medium. The coolant passage is fluid-connected with the coolant jacket 2a through a respective flexible tubing 21 so that the copper tubes 20, the flexible tubings 21 and the coolant jacket 2a define a continuous flow passage for the flow of the coolant medium extending from one of the coolant passages 20a in the respective copper tubes 20 to the other of the coolant passages 20a via the coolant jacket 2a. Accordingly, the cooling medium can be supplied from the coolant passage 20a to one of the copper tubes 20, which is positioned above the other of the cooper tubes 20 as viewed in FIG. 2, into the coolant jacket 2a through the upper flexible tubing 21, and after having flowed through the coolant jacket 2a, can be discharged from the coolant jacket 2a to the outside through the lower flexible tubing 21 and the coolant passage 20a in the other copper tube 20, which is positioned below the first the copper tube 20.

Reference numeral 32, shown in FIG. 3, represents a gas coupling for supplying a plasma treatment gas. The plasma gas originates from the pressurized gas vessel 7, shown in FIG. 1, and travels to the interior 2d of the drum-shaped discharge electrode assembly 2 through a port 17f defined in the rotary shaft 17 and the annular gaps 17e within the axial bores 17c. It is noted that the axial bores 17c are sealed from the atmosphere by means of a plurality of rubber seal rings 33 for each axial bore 17c. These rings are in tight contact with the respective copper tube 20 at the outer end portion of the rotary shaft 17 and inner surface of the respective axial bore 17c, as best shown in FIG. 3. Thus, the interior 2d of the drum-shaped discharge electrode assembly 2 can be filled with the plasma treatment gas and maintained at a pressure higher than the pressure inside the interior 1a of the vacuum vessel 1.

The rod-shaped discharge electrodes 3 are spaced apart and fixed at their opposite ends by retaining members 22A and 22B which are in turn supported within the vacuum vessel 1 by means of insulators 23.

One side of the electric circuit 6 is inserted into the vacuum vessel 1 through an input terminal 6a which insulates the vacuum vessel 1 from the electric circuit 6. This input terminal is connected with the rod-shaped discharge electrode assembly 3. The other side of the electric circuit 6 is connected with the drum-shaped discharge electrode assembly 2 through a slip ring 25, the copper tubes 20 and a conductor 27. The vacuum vessel 1 is electrically insulated from the electric circuit 6 and is maintained at ground. It is, however, noted that both of the discharge electrode assemblies 2 and 3 of the electric circuit 6 are not grounded and are strictly insulated from the vacuum vessel 1.

In the construction described above, of the present invention the vacuum vessel 1 is, as is the case with the prior art apparatus, electrically insulated from the electric circuit. There is no substantial possibility that any discharge of plasma may occur from the rod-shaped discharge electrode assembly 3 to the vacuum vessel 1, and therefore, any possible waste of electric power can be substantially eliminated.

Also, the drum-shaped discharge electrode assembly 2 and the rotary shaft 17 are electrically insulated from each other by the intervention of the insulating members 14 and 15 between a cylindrical body 2c of the drum-shaped discharge electrode assembly 2 and the rotary shaft 17. In this way, the rotary shaft 17 is electrically insulated from the drum-shaped discharge electrode assembly 2, and therefore, there is no possibility that any discharge of plasma will occur between the rod-shaped discharge electrode assembly 3 and the rotary shaft 17, thereby eliminating any possible waste of electric power.

Moreover, since the rotary shaft 17 is electrically insulated from the drum-shaped discharge electrode assembly 2 and the vacuum vessel 1 is also electrically insulated from the electric circuit 6 with which both of the discharge electrode assemblies 2 and 3 are connected to, there will be no possibility that insufficient electric insulation will occur at a relatively narrow corner area, that is, at a location between that intermediate portion 17a of the rotary shaft 17 which extends through the wall of the vacuum vessel 1 and the neighboring bearing assembly 18 located on the wall of the vacuum vessel 1. Accordingly, there is no substantial possibility of an the occurrence of abnormal arc discharge along the inner surface of the wall of the vacuum vessel 1. Therefore, the plasma treatment apparatus can be operated continuously. In addition, since the end portions of the rotary shaft 17 which protrude outwardly from the drum-shaped discharge electrode assembly 2 are electrically insulated from the drum-shaped discharge electrode assembly 2, the rotary shaft 17 can be maintained in a non-electrically charged condition. Therefore there is no substantial possibility that the attendant operator will receive an electric shock.

Furthermore, since the rotary shaft 17 is not electrically charged, there is no possibility that any arc discharge will occur along the mechanical seal 18b which is exposed to the plasma atmosphere and which is generally complicated in structure. Accordingly, the plasma treatment apparatus can be operated continuously for a prolonged length of time.

Similarly, since the possibility of an arc discharge has been diminished at the bearing 19a, a design can be employed to install the bearing 19a within the vacuum vessel 1 whose atmosphere is filled with plasma. Since the relatively heavy drum-shaped discharge electrode assembly 2 can, thereforre, be supported on the rotary shaft 17 within the vacuum vessel 1 by means of the bearings 18a and 19b positioned on respective sides of the drum-shaped discharge electrode assembly 2, the spacing between these two bearings 18a and 19a can be minimized as compared with the case in which they are positioned outside the vacuum vessel 1. Therefore, not only can the rotary shaft have a reduced diameter, but the bearings 18a and 19a can also be minimized in size.

Figures 4, 5:
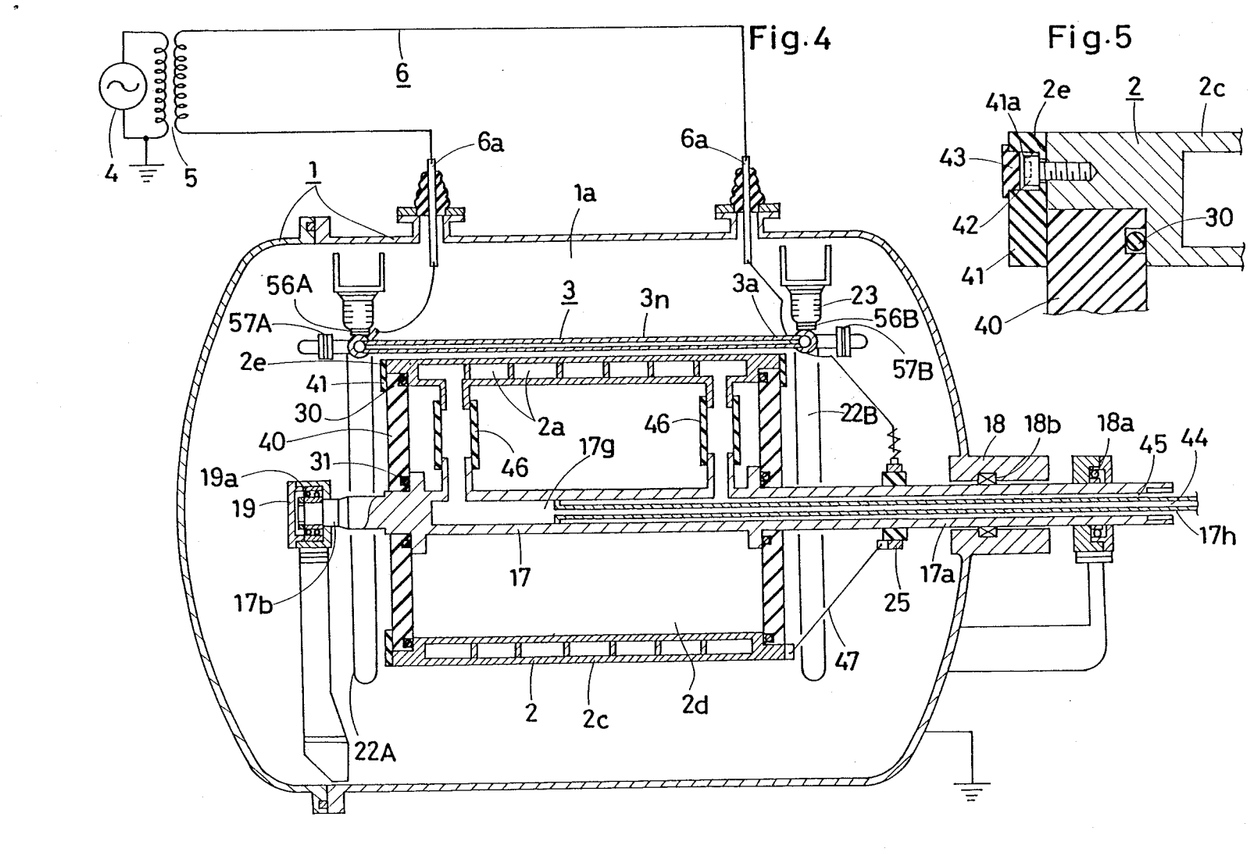
FIG. 4 is a view similar to FIG. 2, showing another preferred embodiment of the present invention.
FIG. 5 is a sectional view showing the manner by which an electrically insulating material is fitted so as to cover one end portion of a drum-shaped discharge electrode assembly in the plasma treatment apparatus shown in FIG. 4.

When a design is employed requiring that the rotary shaft 17 and the drum-shaped discharge electrode assembly 2 are electrically insulated from each other, and no copper tubes which serve as an electric conductor are inserted through the rotary shaft 17, such as shown in FIG. 4, no electric power can be supplied from the electric power source, positioned externally of the vacuum vessel 1, to the drum-shaped discharge electrode assembly 2 through the rotary shaft 17. In this design, in order for the electric power to be supplied to the drum-shaped discharge electrode assembly 2, the slip ring 25 is required to be positioned inside the vacuum vessel 1. However, in the embodiment shown in and described with reference to FIGS. 1 to 3, the rotary shaft 17 rotates together with the drum-shaped discharge electrode assembly 2. The rotary shaft contains the copper tubes 20 inserted in it and one of the copper tubes 20 is electrically connected with the electric circuit 6. Thus, one of the copper tubes 20 serves as an electric conductor through which the electric power can be effectively supplied from the power source to the drum-shaped discharge electrode assembly 2. Therefore, even though the rotary shaft 17 and the drum-shaped discharge electrode assembly 2 are electrically insulated from each other, the slip ring 25 for supplying the electric power to the rotating drum-shaped discharge electrode assembly 2 through the rotary shaft 17 can be advantageously positioned outside the vacuum vessel 1. The positioning of the slip ring 25 outside the vacuum vessel 1 is advantageous because any possible contamination of the plasma atmosphere within the vacuum vessel 1 and/or any possible occurrence of arc discharge which result from the presence of metallic particles worn off from the slip ring can be effectively eliminated. Therefore, the plasma treating apparatus according to the present invention can be advantageously operated continuously for a prolonged length of time.

Also, in order to accomplish a favorable plasma treatment, countermeasures have to be taken to avoid any possible generation of heat from either or both the rotary shaft 17 and the copper tubes 20 which would occur as a result of the consumption of a substantial amount of electric power. However, in the foregoing embodiment, since the coolant jacket 2a defines the passage for the flow of the cooling medium and the copper tubes 20 are fluid-connected in series with each other, no extra coolant passage piping is needed for cooling the copper tubes 20, the portion of the electric circuit 6 which is inserted through the rotary shaft 17. Moreover, in view of the fact that the copper tubes 20 are used as an electric conductor, the copper tubes 20 which would generate heat can be effectively cooled. In addition, since the rotary shaft 17 is made of stainless steel having a relatively low magnetic permeability and also a relatively small volume resistivity, there is no possibility that heat will be generated by the magnetic induction induced by the flow of the electric current through the copper tubes 20.

It is noted that although the foregoing description reference used one of the copper tubes 20 for supplying medium into the coolant jacket and the other for returning the discharge of the used cooling medium from the same coolant jacket, an alternative would be to use any number of copper tubes instead of the two copper tubes such as shown and described. Where one copper tube is employed, the rotary shaft 17 may have a corresponding bore of a diameter greater than the outer diameter of the copper tube such that the hollow of the copper tube and the annular space between the wall defining the bore in the rotary shaft and the outer peripheral surface of the copper tube can be used for the in-flow and out-flow of the cooling medium relative to the coolant jacket.

In the foregoing embodiment, the interior 2d of the drum-shaped discharge electrode assembly 2 has been shown and described as sealed from the interior 1a of the vacuum vessel 1 by the action of the rubber seal rings 30 and 31. On the other hand, the supply of the gaseous medium into the interior 2d of the drum-shaped discharge electrode assembly 2 through the gas coupling 32 forces the pressure inside the interior 2d of the drum-shaped discharge electrode assembly 2 to a higher pressure than the pressure inside the interior 1a of the vacuum vessel 1. Accordingly, there is no substantial possibility that the plasma gas inside the interior 1a of the vacuum vessel 1 may enter the interior 2d of the drum-shaped discharge electrode assembly 2. Hence, no possible plasma discharge will be induced within the interior 2d of the drum-shaped discharge electrode assembly 2, permitting the plasma discharge to be stabilized. Where the plasma treatment gas is introduced from the pressurized gas vessel 7, shown in FIG. 1, into the interior 2d of the drum-shaped discharge electrode assembly 2 as described in the foregoing embodiment, any possible reduction of the purity of the plasma treating gas within the vacuum vessel 1 can be avoided by allowing a portion of the gaseous medium to leak from the interior 2d into the interior 1a of the vacuum vessel 1.

It is noted that, if desired, the interior 2d of the drum-shaped discharge electrode assembly 2 may be in communication with the atmosphere through the port 17f (shown in FIG. 3) defined in the rotary shaft 17. In such a case, since the interior 2d will not be filled with any plasma atmosphere and the pressure inside the interior 2d may be equal to the atmosphere, any possible occurrence of a local spark discharge within the interior 2d can be advantageously minimized and the plasma discharge can be stabilized.

Since the insulating members 14 exposed to the plasma atmosphere, as shown in FIG. 2, are glass linings having an excellent weatherability, the insulating members will not deteriorate substantially as a consequent of being treated with the low-temperature plasma and/or in the presence of the arc discharge. Accordingly, there is no possibility that the insulating members 14 themselves may be damaged and/or an impurity gaseous medium will be generated within the vaccum vessel 1. It is, however, noted that, instead of using the glass lining, either one or a mixture of ceramic material, fine ceramic material and plastics having a resistance to heat, to ultraviolet rays and/or electron rays can be used as a material for each of the insulating members 14.

FIGS. 4 and 5 illustrate the plasma treatment apparatus according to another preferred embodiment of the present invention.

In the embodiment shown in FIG. 4, the cylindrical body 2c of the drum-shaped discharge electrode assembly 2 is fixedly mounted on the rotary shaft 17 through generally plate-like insulating members 40 each having a central hole through which the rotary shaft 17 extends. The drum-shaped discharge electrode assembly 2 has its opposite annular ends 2e annular insulating members 41 which are firmly secured by the use of fitting bolts 42 and bolt receiving bores 41a situated in the annular insulating members 41. The receiving bores are closed respective electrically insulating plugs 43 as shown in FIG. 5, whereby the opposite annular ends 2e are substantially completely covered by the annular insulating members 41. Each of the insulating members 40 and 41 is made of, for example, polycarbonate resin or ceramics. The interior 2d of the drum-shaped discharge electrode assembly 2 is hermetically sealed from both the atmosphere and the interior 1a of the vacuum vessel 1 by the insulating members 40, the rubber rings 30 and 31, and etc.

In FIG. 4, the rotary shaft 17 is formed with an axial bore 17g through which a piping 17h is inserted so that the in-flow passage 44 for the cooling medium and the out-flow passage 45 for the same cooling medium can be defined inside and outside the piping 17h, respectively. Reference numeral 46 represents connecting sleeves (tubings) made of insulating material such as, for example, rubber, and allows the fluid-connection between the in-flow and out-flow passages 44 and 45 and the coolant jacket 2a.

Figure 6:
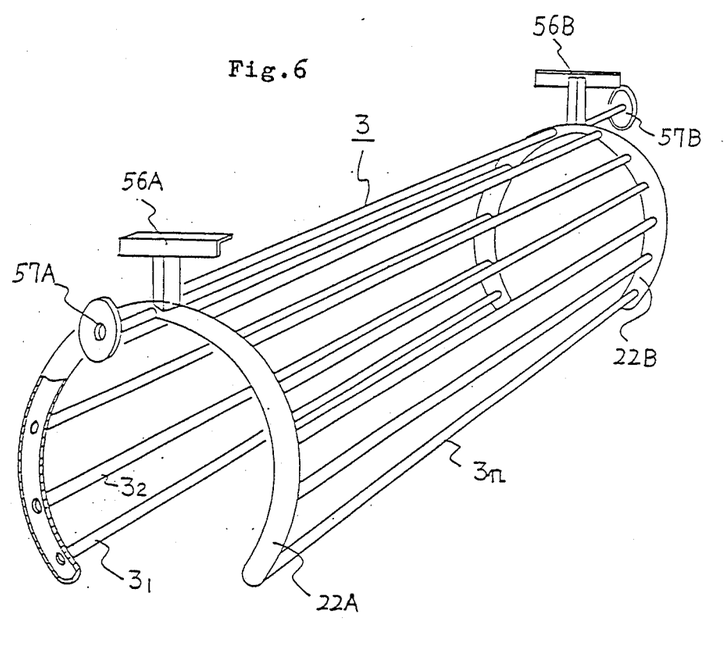
FIG. 6 is a perspective view, on an enlarged scale, of a second discharge electrode assembly used in the apparatus shown in FIG. 4.

The rod-shaped discharge electrodes $3_1$, $3_2$, ... and $3_n$ confronting the drum-shaped discharge electrode assembly 2 (the first discharge electrode assembly) are, as best shown in FIG. 6, rigidly secured, or otherwise welded, at their opposite ends 3a to the respective retaining members 22A and 22B. The members 22A and 22B are in turn supported by the vacuum vessel 1 by means of the insulators 23 in FIG. 4. A generally cage-shaped discharge electrode assembly 3 (the second discharge electrode assembly) is constituted by these rod-shaped discharge electrodes $3_1$, $3_2$, ... and $3_n$ and the retaining members 22A and 22B. This cage-shaped discharge electrode assembly 3 is of a design wherein the rod-shaped discharge electrodes $3_1$, $3_2$, ... and $3_n$ are supported by the retaining members 22A and 22B while being spaced at an equal pitch from each other, and in turn, are supported within the vacuum vessel 1 by the retaining members 22A and 22B which are connected to respective support brackets 56A and 56B. These brackets are secured to the respective insulators 23.

While each neighboring rod-shaped discharge electrodes $3_1$, $3_2$, ... and $3_n$ is preferred to be spaced at an equal pitch from each other, a deviation may be, in practice, tolerable due to considerations of the cost required to assembly or manufacture a discharge electrode. In practice, half or less the total number of the rod-shaped discharge electrodes may be spaced from each other at a pitch with deviation equal to or smaller than 3 times, preferably 1.3 times, the average outer diameter of all of the rod-shaped discharge electrodes $3_1$, $3_2$, ... and $3_n$.

Each of the retaining members 22A and 22B for supporting the rod-shaped discharge electrodes $3_1$, $3_2$, ... and $3_n$, so as to permit the latter to occupy a portion of the imaginary circle, may be of a split construction comprising two or more members, if desired, due to considerations of the manufacturing, fitting procedures and/or the purpose of convenience in maintenance and servicing.

Figure 7:
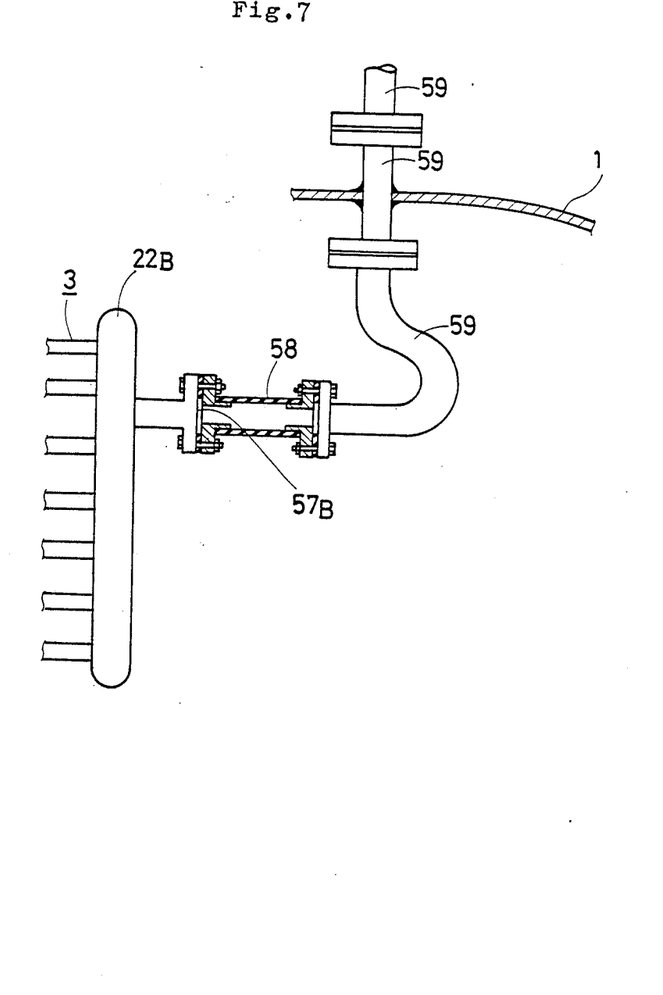
FIG. 7 is a schematic side view, with a portion cut away, of a piping system through which a cooling medium is alternately supplied to and drained from the discharge electrode assembly shown in FIG. 6.

Reference numerals 57A and 57B represent supply and discharge ports, respectively, for the flow of the cooling medium. In this illustrated embodiment, the cage-shaped discharge electrode assembly 3 is designed to be positively cooled by the cooling medium. For this purpose, each of the rod-shaped discharge electrodes $3_1$, $3_2$, ... and $3_n$ is a type having a coolant passage defined in it, each of the retaining members 22A and 22B is constructed having a coolant passage defined in it for supplying and discharging the cooling medium to and from the rod-shaped discharge electrodes $3_1$, $3_2$, ... and $3_n$. Each of the supply and discharge ports 57A and 57B is, as illustrated in FIG. 7, designed to be fluid-connected with a supply or discharge piping 59, fixedly extending through the vacuum vessel 1, through a respective connecting tubing 58 being 30 mm or more in length and made of insulating material such as, for example, ceramics. By the intervention of the insulating connecting tubing 58, any possible occurrence of a local spark or an instantaneous abnormal arc discharge around the supply or discharge piping 59 can be minimized considerably as compared with the case wherein no insulating connecting tubing is employed.

Figure 8:
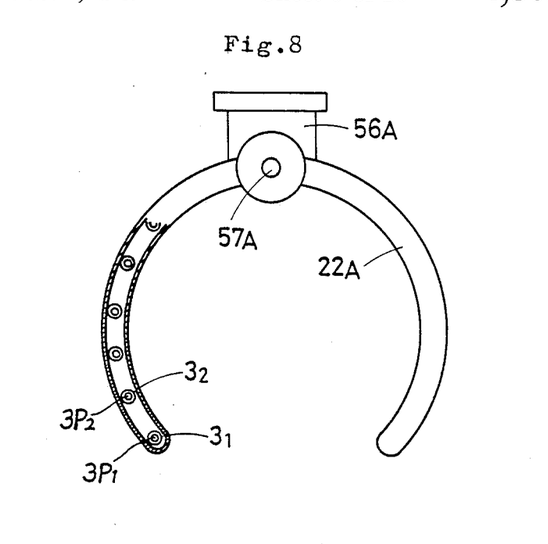
FIGS. 8 and 9 are front elevational and side views, respectively, showing the piping system shown in FIG. 7.
Figure 9:
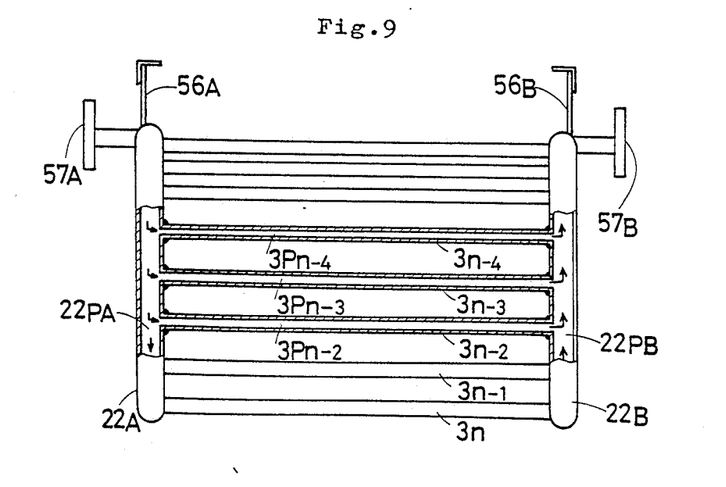

FIGS. 8 and 9 illustrate the details of the cage-shaped discharge electrode assembly 3 provided with the cooling system, wherein FIG. 8 is a front elevational view and FIG. 9 is a side view. In this illustrated example, a coolant passage 22PA defined in one of the retaining members 22A serves as a supply passage in communication with the coolant passages $3P_1$ to $3P_n$ in the respective rod-shaped discharge electrodes $3_1$ to $3_n$, whereas a coolant passage 22PB defined in the other retaining member 22B serves as a discharge passage in communication with the coolant passage $3P_1$ to $3P_n$ in the respective rod-shaped discharge electrodes $3_1$ to $3_n$.

It is noted that, in the plasma treatment apparatus according to the second preferred embodiment, the slip ring 25, shown in FIG. 4, is arranged within the vacuum vessel 1 and is connected with a portion of one annular end 2d of the drum-shaped discharge electrode assembly 2 through a conductor 47. The remaining structural details are substantially identical with that in the first preferred embodiment shown in FIG. 2, and therefore, will not be reiterated because like parts are designated by like reference numerals.

According to the second preferred embodiment shown in to FIGS. 4 to 9, since the annular opposite ends 2e of the drum-shaped discharge electrode assembly 2 are covered by the insulating members 41, any unnecessary plasma discharge from the rod-shaped discharge electrode assembly 3 towards the annular ends 2d of the drum-shaped discharge electrode assembly 2 can be avoided. Also, this feature brings about the additional advantage that any possible elevation of temperature in the vicinity of the opposite ends 2e of the drum-shaped discharge electrode assembly 2 can be avoided, thus the plasma treatment can be produced uniformly over the entire surface of the sheet-like structure.

Moreover, since the coolant jacket 2a is communication with the coolant passages 44 and 45 through the connecting sleeves 46 which are made of insulating material, the electric current is permitted to flow from the drum-shaped discharge electrode assembly 2 to the rotary shaft 17 only through the cooling medium. Therefore, the rotary shaft 17 can be very strictly insulated electrically from the drum-shaped discharge electrode assembly 2.

In addition, since the hermetically sealed interior 2d of the drum-shaped discharge electrode assembly 2 is filled with the atmosphere, not the plasma atmosphere, because it was assembled in the atmosphere and not supplied with the plasma treatment gas, any possible occurrence of the local spark within the interior 2d can be minimized and the plasma discharge can be stabilized.

Furthermore, since the plural rod-shaped discharge electrodes $3_1$ to $3_n$ are arranged to be retained by the retaining members 22A and 22B thereby presenting the cage-shaped discharge electrode assembly 3 which is in turn supported within the vaccum vessel 1, as compared with a general structural arrangement wherein the rod-shaped discharge electrodes $3_1$ to $3_n$ are made to extend through the vacuum vessel 1 and are the supported in a cantilever fashion by a base positioned outside the vacuum vessel 1, the structure, wherein the rod-shaped discharge electrodes $3_1$ to $3_n$ extend through the vaccum vessel 1, is eliminated. Therefore, there is no possibility that the discharge will become unstable as a result of the occurrence of a local spark or an instantaneous abnormal arc discharge at a site where the rod-shaped discharge electrode assembly extend through the vacuum vessel, thereby permitting the plasma treatment apparatus to be continuously operated for a prolonged length of time with a supply of a relatively large amount of electric power.

Further, since a structure is employed wherein the plural rod-shaped discharge electrodes $3_1$ to $3_n$ are supported at their opposite ends, and the stresses which would be built up in the rod-shaped discharge electrodes $3_1$ to $3_n$ can therefore be reduced as compared with that in the above described cantilever support structure, the rod-shaped discharge electrodes $3_1$ to $3_n$ may be employed having a reduced diameter. Therefore, the cost required to manufacture the apparatus can be minimized. In addition, the use of the rod-shaped discharge electrodes $3_1$ to $3_n$ of reduced diameter permits the pitch between each neighboring rod-shaped discharge electrode to be reduced thereby permitting the use of a considerably increased number of the rod-shaped discharge electrodes and the input electric power from the rod-shaped discharge electrodes to be increased markedly.

Furthermore, since the plural rod-shaped discharge electrodes $3_1$ to $3_n$ are fixedly supported at their opposite ends by the retaining members 22A and 22B, their position will not change with time, and any deviation in quality will not occur in the products.

Yet further, since the discharge electrode assembly 3 of the cage-shaped structure is a structure wherein the rod-shaped discharge electrodes $3_1$ to $3_n$ forming the discharge electrode assembly 3 are cooled by the use of the cooling medium, the surface temperature of each of the rod-shaped discharge electrodes $3_1$ to $3_n$ can be maintained at a constant value uniform. Therefore, the low-temperature plasma treatment can be produced steadily for a prolonged length of time with no possibility of local temperature rise, that is, with no possibility that the sheet-like structure A being treated is excessively heated to such an extent as to result in modifications to the quality of the products.

Figure 10:
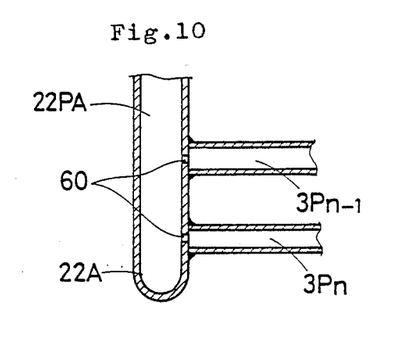
FIG. 10 is a longitudinal sectional view showing an essential portion according to a third preferred embodiment of the present invention.

FIG. 10 illustrates a third preferred embodiment of the present invention showing a modified form of the cage-shaped discharge electrode assembly 3 provided with the cooling system, and a partially enlarged sectional view of the connection between the support member 22A and the rod-shaped discharge electrodes $3_1$ to $3_n$ is shown in FIG. 9. In this embodiment, each of the coolant passages $3P_1$ to $3P_n$ in the respective rod-shaped discharge electrodes $3_1$ to $3_n$ is provided with the orifice 60, so that, by suitably selecting the inner diameter of the orifice 60, the cooling medium flowing from the retaining member 22A towards each of the rod-shaped discharge electrodes $3_1$ to $3_n$ can be uniformly distributed in the rod-shaped discharge electrodes $3_1$ to $3_n$. In this embodiment, each of the orifices 60 is constituted by a small perforation defined in the retaining member 22A.

Figure 11:
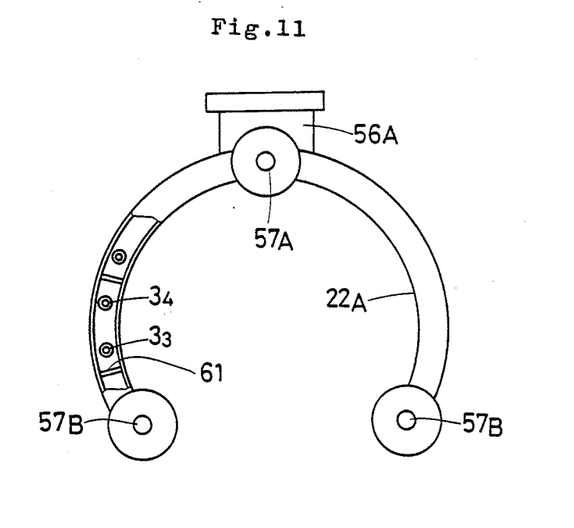
FIGS. 11 and 12 are front elevational and side views, respectively, showing a fourth preferred embodiment of the present invention.
Figure 12:
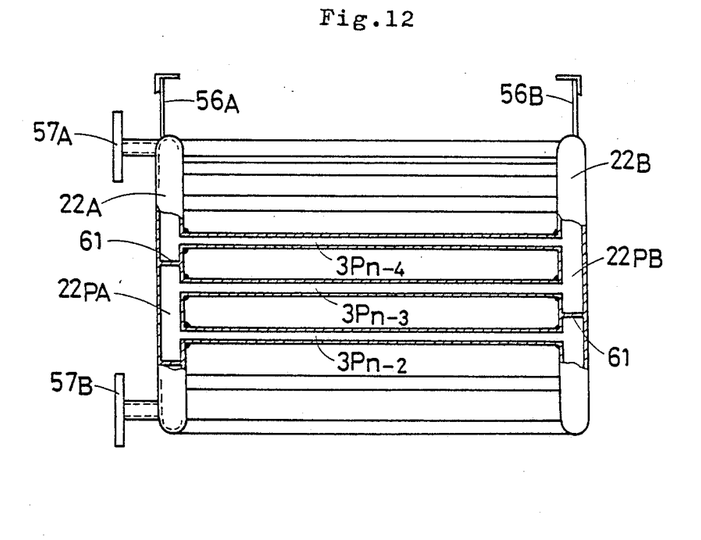

FIGS. 11 and 12 illustrate a fourth preferred embodiment of the present invention showing a further modified form of the cage-shaped discharge electrode assembly 3 provided with the cooling system, wherein FIG. 11 is a front elevational view of the cage-shaped discharge electrode assembly 3 and FIG. 12 is a side view. In this embodiment, the coolant passage 22PA or 22PB in each of the retaining members 22A and 22B is partitioned by partitioning walls 61 so that each of the coolant passages $3P_1$, $3P_2$, ... and $3P_n$ in the respective rod-shaped discharge electrodes $3_1$ to $3_n$ can be arranged sequentially and in series.

Figure 13:
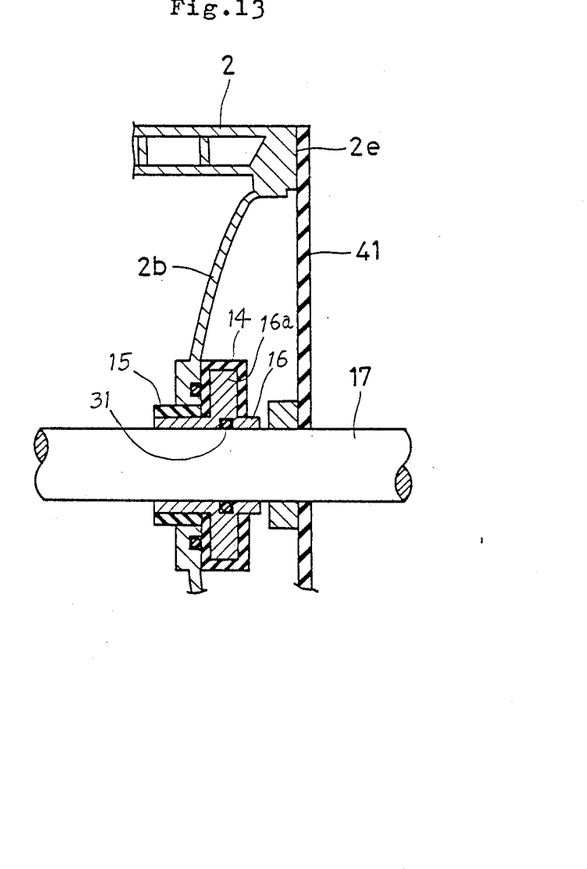
FIG. 13 is a longitudinal sectional view showing the manner by which an electrically insulating material is fitted so as to cover one end portion of a drum-shaped discharge electrode assembly according to a fifth preferred embodiment of the present invention.

It is noted that, in the first preferred embodiment, shown in FIG. 1, the annular ends 2e of the drum-shaped discharge electrode assembly 2 may be covered by the insulating members 41 as is the case with the fifth preferred embodiment shown in FIG. 13. Also, the rod-shaped discharge electrode assembly 3 shown in FIG. 2 may be provided with the cooling system shown in FIGS. 6 to 12.

Figure 14:
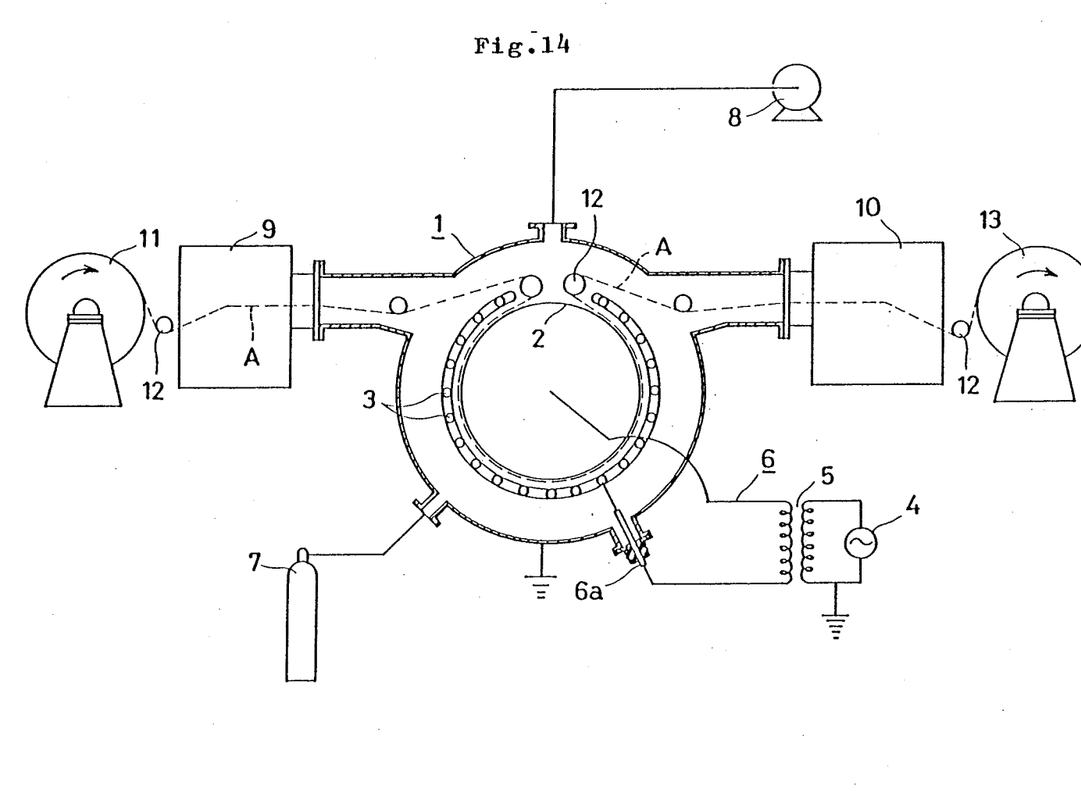
FIG. 14 is a schematic sectional view showing the construction of a different type of the plasma treatment apparatus applied for the treatment of a sheet-like structure.

FIG. 14 illustrates a different plasma treatment apparatus for the sheet-like structure to which the present invention is applicable. In this figure, reference numerals 9 and 10 represents respective auxiliary vacuum chambers. While a plurality of sealing rolls (not shown) and sealing chambers (not shown) are arranged inside the auxiliary vacuum chambers 9 and 10 and along the direction of travel of the sheet-like structure A, the maintenance of the pressure within the vacuum chamber 1 at a predetermined value can be assisted by evacuating the sealing chambers with a vacuum so that the pressure can be progressively decreased from the atmospheric pressure.

Although not shown, the present invention can be equally applicable to the arrangement wherein the sheet feeder unit 11 and the sheet take-up unit 13 are disposed within the vacuum chamber 1 together with both of the discharge electrode assemblies 2 and 3.

From the foregoing description, it has now become clear that, according to the present invention, the waste of electric power consumed by the plasma treatment apparatus for the sheet-like structure, which consumes a relatively great amount of electric power, can be advantageously minimized, and also, the occurrence of the abnormal arc discharge can be effectively avoided, thereby allowing the plasma treatment apparatus to have a large enough handling capacity to permit it to be employed by industries and to be operated continuously.

Although the present invention has been described in connection with the preferred embodiments with reference to the accompanying drawings, it is noted that numerous changes and modifications can be readily conceived by those skilled in the art within the present scope and spirit of the present invention. Such changes and modifications are, unless they depart from the scope of the present invention as defined by the appended claims, to be understood as included therein.

What is claimed is:

1. A plasma treating apparatus for treating a sheet-like structure comprising:
   a substantially drum-shaped first discharge electrode assembly;
   a rotary shaft, rigidly connected to said first discharge electrode assembly, for rotating said first discharge electrode assembly;
   a vacuum vessel surrounding said first discharge electrode assembly;
   said rotary shaft extending through said vacuum vessel;
   said sheet-like structure arranged about an outer periphery of said first discharge electrode assembly;
   a second discharge electrode assembly, disposed within said vacuum vessel and confronting said first discharge electrode assembly;
   an electric circuit for supplying electric power to said first and second discharge electrode assembly;
   first insulating members for insulating electrically said vacuum vessel from said electric circuit; and
   second insulating members for electrically insulating the drum of said first discharge electrode assembly from said rotary shaft.

2. The apparatus as claimed in claim 1, wherein a conductor connected with said first discharge electrode assembly is inserted through said rotary shaft.

3. The apparatus as claimed in claim 2, wherein said first discharge electrode assembly includes a first coolang passage means for directing a flow of a cooling medium; and
   second coolant passage means for directing the flow of said cooling medium;
   said conductor having a passage for the flow of said cooling medium;
   said first coolant passage means being connected in series with said second coolant passage means and said conductor to enable the flow of said cooling medium through said conductor, thereby cooling said conductor.

4. The apparatus as claimed in claim 1, wherein said first discharge electrode assembly includes first coolant passage means for directing a flow of a cooling medium;
   said rotary shaft including second coolant passage means for directing the flow of said cooling medium,
   a connecting tube, connected to said first coolant passage means, made of insulating material; and
   said first coolant passage means being fluid-connected through said connecting tube with said second coolant passage means defined inside said rotary shaft.

5. The apparatus as claimed in claim 1, wherein said first discharge electrode assembly has an interior within the drum;
   said interior communicating with a source of gaseous medium containing a plasma treatment gas and being maintained at a pressure higher than a pressure inside said vacuum vessel.

6. The apparatus as claimed in claim 1, wherein said first discharge electrode assembly has an interior within the drum;
   said interior communicating with the atmosphere.

7. The apparatus as claimed in claim 1, wherein said first discharge electrode assembly has an interior within the drum being completely sealed.

8. The apparatus as claimed in claim 1, wherein said first discharge electrode assembly has opposite ends covered by respective insulating members.

9. A plasma treating apparatus for treating a sheet-like structure comprising:
   a rotary shaft for providing rotation;
   a first discharge assembly, rigidly mounted on said rotary shaft, having a cylindrical shape;
   said first discharge assembly rotating with said rotary shaft;
   a vacuum vessel surrounding said first discharge assembly;
   said rotary shaft extending through said vacuum vessel;
   said sheet-like structure being arranged about an outer periphery of said first discharge assembly;
   a second discharge assembly, disposed within said vacuum vessel and confronting said first discharge assembly, for establishing a plasma between said first and second discharge assemblies;
   electric power means, operatively connected to said first and second discharge assemblies, for providing electrical power to said first and second discharge assemblies;
   first insulating means, for electrically insulating said electric power means from said vacuum vessel; and
   second insulating means, for electrically insulating said first discharge assembly from said rotary shaft;
   said second discharge assembly including a plurality of substantially rod-shaped discharge electrodes;
   said discharge electrodes being supported at opposite ends by respective retaining members and extending parallel to each other, thereby occupying a portion of an imaginary circle, said imaginary circle following the outer periphery of said first discharge assembly, thereby representing a substantially cage-shaped structure.

10. The apparatus as claimed in claim 9, wherein each of said rod-shaped discharge electrodes has a first coolant passage defined therein for the flow of a cooling medium; and
    said retaining members, having second coolant passages;
    said second coolant passages connecting inlet ends of said first coolant passages together and outlet ends of the first coolant passage together, thereby establishing a parallel flow of said cooling medium through said first coolant passages.

11. The apparatus as claimed in claim 9, wherein each of said rod-shaped discharge electrodes has a first coolant passage defined therein for the flow of a cooling medium; and
    said retaining members having second coolant passages;
    said second coolant passages connecting adjacent ends of said first coolant passages together, thereby establishing a serial flow of said cooling medium through said first coolant passages.

12. The apparatus as claimed in claim 10, wherein said retaining members have supply and discharge ports to enable the supplying and discharging of said first coolant passages with said cooling medium.

13. The apparatus as claimed in claim 11, wherein said retaining members have supply and discharge ports to enable the supplying and discharging of said first coolant passages with said cooling medium.

14. The apparatus as claimed in claim 12, wherein said supply and discharge ports are connected to connecting tubings, said connecting tubes being each made of insulating material; and     said apparatus further comprising supply and discharge pipings extending through said vacuum vessel.

15. The apparatus as claimed in claim 13, wherein said supply and discharge ports are connected to connecting tubings, said connecting tubes being each made of insulating material; and     said apparatus further comprising supply and discharge pipings extending through said vacuum vessel.

* * * * *